United States Patent [19]
Seki et al.

[11] Patent Number: 5,120,386
[45] Date of Patent: Jun. 9, 1992

[54] FILM STICKING METHOD AND APPARATUS

[75] Inventors: Mitsuhiro Seki, Tokyo; Fumio Hamamura, Kanagawa, both of Japan

[73] Assignee: Somar Corporation, Tokyo, Japan

[21] Appl. No.: 586,356

[22] Filed: Sep. 21, 1990

[30] Foreign Application Priority Data
Mar. 19, 1990 [JP] Japan .................................. 2-71460

[51] Int. Cl.$^5$ .............. B32B 31/00; B32B 7/00; B26D 3/00; B26D 5/00
[52] U.S. Cl. .................................. 156/250; 156/510; 83/56; 83/214; 83/578; 83/614
[58] Field of Search ............. 156/510, 521, 522, 250; 83/56, 214, 578, 614

[56] References Cited
U.S. PATENT DOCUMENTS

| | | | |
|---|---|---|---|
| 2,833,350 | 5/1958 | Merkur | 83/614 |
| 3,779,121 | 12/1973 | Lagain | 83/614 |
| 3,864,997 | 2/1975 | Pearl et al. | 83/56 |
| 4,599,925 | 7/1986 | Rom | 83/56 |
| 4,659,419 | 4/1987 | Miyake | 156/522 |
| 4,743,325 | 5/1988 | Miyake | 156/521 |
| 4,785,698 | 11/1988 | Stork | 83/614 |
| 4,881,439 | 11/1989 | Biedermann et al. | 83/614 |
| 4,964,937 | 10/1990 | Seki | 156/521 |

Primary Examiner—David A. Simmons
Assistant Examiner—Jeffrey G. Payne
Attorney, Agent, or Firm—Sughrue, Mion, Zinn Macpeak & Seas

[57] ABSTRACT

A film sticking method is disclosed in which the tip of the cutting portion of a sharp-pointed cutting member is caused to pierce a continuous film. The member is moved rightward and leftward across the direction of the feed of the film so that the film is cut off to a prescribed length. The cut-off film is stuck to a base plate. Also, a film sticking apparatus is disclosed which includes a film cutter for cutting off a continuous film to a prescribed length by moving a cutting member across the direction of the feed of the film and sticks the cut-off film to a base plate. The cutting member is formed so that it is sharp-pointed and has a cutting edge at least one side of edges of the member. The cutting edge can be moved backward and forward relative to the surface of the continuous film.

2 Claims, 4 Drawing Sheets

FILM STICKING METHOD AND APPARATUS

BACKGROUND OF THE INVENTION

The present invention relates to a film sticking method and an apparatus, and more particularly relates to an art effective for a base plate for the printed circuit board of an electronic machine such as a computer.

An apparatus for sticking a stratified film to each of base plates for printed circuit boards as the base plates are conveyed one after another on a roller conveyor or the like and the continuous stratified film is cut off to a length corresponding to that of the base plate was disclosed in the Japanese patent application (OPI) No. 200991/88 (the term "OPI" as used herein means an "unexamined published application"). The film cutter of the film sticking apparatus is a moving cutter having a rotary cutting disk, which is moved across the stratified film.

Since the stratified film is cut off by the rotary cutting disk of the moving cutter mentioned above, a chip, a particle or the like is made from the film and clings to the surface of the base plate, to which the resist film of the stratified film is already stuck or yet to be stuck. This is a problem. The chip, the particle or the like can cling to the reception groove of the cutter, a film suction groove, a film suction hole or the like. This is also a problem. If the chip, the particle or the like clings to the base plate, light undergoes diffused reflection due to the chip, the particle or the like to lower the accuracy of exposure to the light in making a wiring pattern on the base plate. This is also a problem. Although it is conceivable to move a knife-like cutter across the film from the side edge thereof to cut off the film so as to solve the above problems, the film is distorted or curled at the side edge thereof due to the local forces applied to the film to make it difficult to smoothly insert the cutter into the side edge of the film from the outside and to make it likely that the film fails to be cut off or is improperly cut off. This is also a problem.

SUMMARY OF THE INVENTION

Accordingly, it is an object of the present invention to provide a film sticking method and an apparatus for practicing it, in each of which the generation of a chip or the like from a continuous film due to the cutoff thereof is reduced.

It is another object of the present invention to provide an art in which a continuous film is prevented from failing to be cut off or being improperly cut off, at the time of the start of the cutoff of the film.

The above-mentioned and other objects and novel features of the present invention will be apparent from the description herein and the drawings attached hereto.

It is the most major feature of the present invention that in the film sticking method provided in accordance with the present invention to solve the above-mentioned problems, the tip of the cutting portion of a sharp-pointed cutting member is caused to pierce a continuous film, and the cutting member is moved rightward and leftward across the direction of the feed of the film to cut off the film to a prescribed length, and the cut-off film is stuck to a base plate.

It is another feature of the present invention that the tips of the cutting portions of a pair of sharp-pointed cutting members are caused to pierce a continuous film, and the cutting members are moved rightward and leftward, respectively, across the direction of the feed of the film to cut off the film to a prescribed length.

It is yet another feature of the present invention that in the apparatus which is for practicing the film sticking method, has a cutter for cutting off the continuous film to the prescribed length by moving the cutting member of the cutter across the direction of the feed of the film and sticks the cut-off film to the base plate, the cutting member has the sharp-pointed cutting portion which can be moved backward and forward relative to the surface of the continuous film.

It is yet another feature of the present invention that a pair of cutting members, which are moved across the direction of the feed of a continuous film, are provided, and the sharppointed cutting portions of the cutting members can be moved backward and forward and moved rightward and leftward from the prescribed point of the film toward both the side edges thereof.

As for the means mentioned above, the tip of the cutting portion of the sharp-pointed cutting member is caused to pierce the continuous film, and the cutting member is moved rightward and leftward across the direction of the feed of the film to cut off the film to the prescribed length. For that reason, the generation of the chip or the like from the continuous film due to the cutoff thereof is reduced.

As for the other means mentioned above, the tips of the cutting portions of the pair of sharp-pointed cutting members are caused to pierce the continuous film, and the cutting members are moved rightward and leftward, respectively, across the direction of the feed of the film to cut off the film to the prescribed. For that reason, the generation of the chip or the like from the continuous film due to the cutoff thereof is reduced, and the cutoff is rapidly performed.

Since the tip of the cutting portion of each of the sharp-pointed cutting members mentioned above is caused to pierce the continuous film, the stress produced in the film by the cutting member at the time of the start of the cutoff of the film is reduced so that the cutoff is started without distorting or curling the film. Also, since the tip of each sharp-pointed cutting member pierce the continuous film and is moved right and left in a direction intersecting with the continuous film supply direction, thereby cut the film in a prescribed length, it is possible to smoothly cut the film in the initial cutting state even if the film side edge would be curled. For that reason, the film is prevented from failing to be cut off or being improperly cut off, at the time of the start of the cutoff of the film.

DESCRIPTION OF THE PREFERRED EMBODIMENTS

Figure 1:
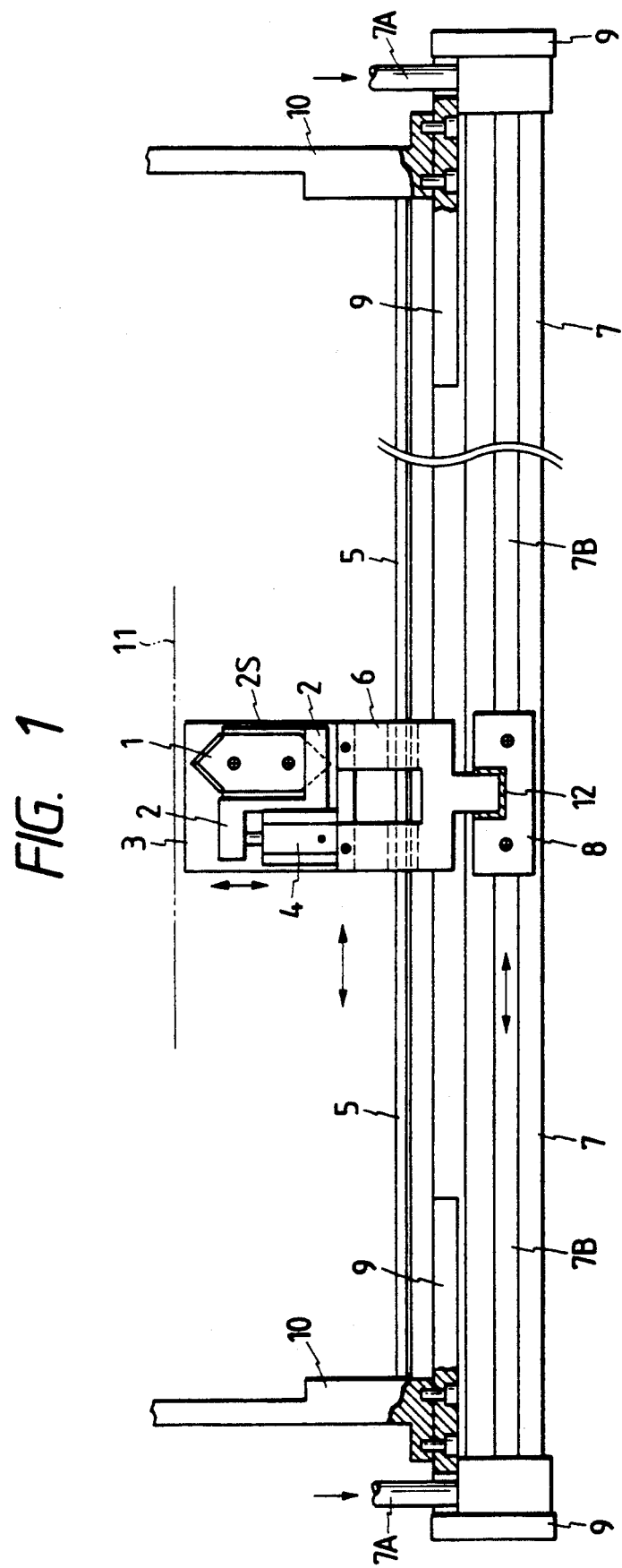
FIG. 1 is a plan view of the film cutter of a sticking apparatus which is an embodiment of the present invention and by which stratified films each consisting of a photosensitive resin layer and a light-transmissible resin film are stuck, under heat and pressure, to the top and bottom of a base plate for a printed circuit board.

Embodiments of the present invention are hereafter described in detail with reference to the drawings. Equivalents shown in the drawings are denoted by the same reference symbols therein and not repeatedly described in detail hereinafter.

Figure 3:
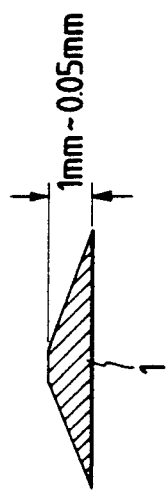
FIG. 3 is a sectional view of the cutting member along a line III—III shown in FIG. 2.
Figure 4:
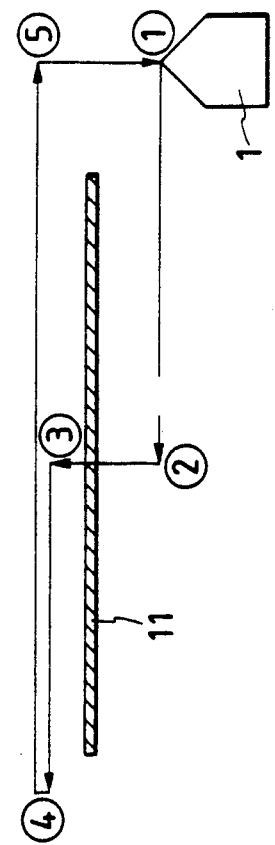
FIG. 4 is a view for describing the movement of the cutting member.
Figure 2:
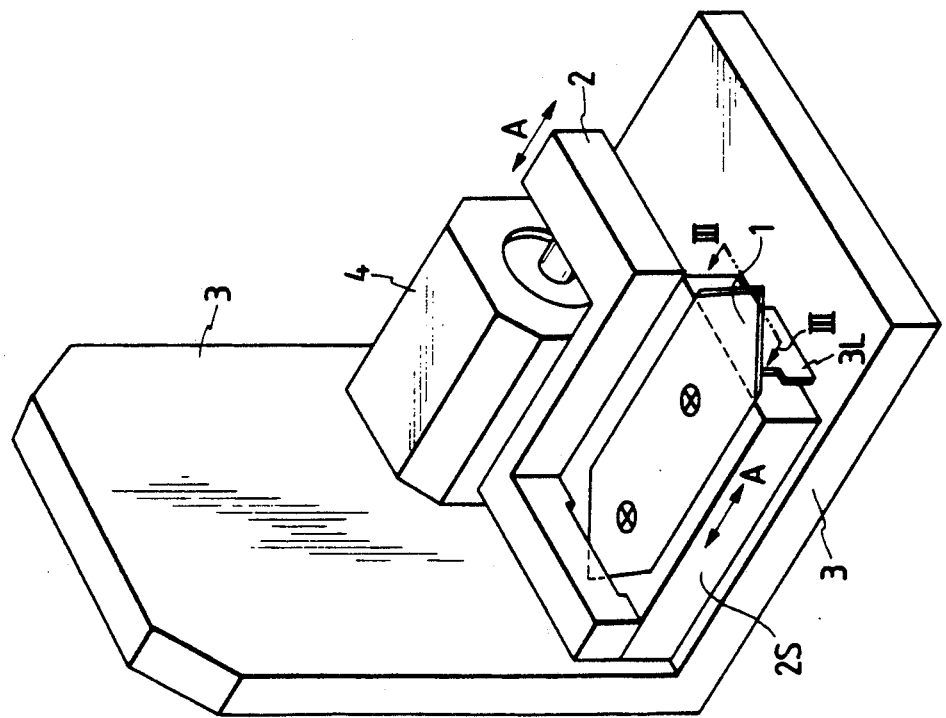
FIG. 2 is a perspective view of the cutting member section of the film cutter.

FIG. 1 is a plan view of the film cutter of a sticking apparatus which is one of the embodiments and by which stratified films each consisting of a photosensitive resin layer and a light-transmissible resin film are stuck, under heat and pressure, to the top and bottom of a base plate for a printed circuit board. FIG. 2 is a perspective view of the cutting member section of the film cutter. FIG. 3 is a sectional view of the cutting member of the film cutter along a line III—III shown in FIG. 2. FIG. 4 is a view for describing the movement of the cutting member.

As shown in FIGS. 1 and 2, the film cutter includes the sharp-pointed cutting member 1 secured to a cutting member support rest 2S secured to a cutting member support frame 2. The cutting member support rest 2S is provided so that the cutting member 1 can be moved backward and forward in directions shown by arrows A in FIG. 2 and perpendicular to the surface of the continuous stratified film 11. For that purpose, the support rest 2S can be slid on a cutting member slide rail 3L provided on a cutting member mounting rest 3 shaped as L. The cutting member support frame 2 is coupled to the piston rod of a pneumatic cylinder 4 for moving the cutting member 1 perpendicularly to the surface of the continuous stratified film 11.

As shown in FIG. 3, the thickness of the cutting member 1 is 0.05 mm to 1 mm, preferably 0.1 mm to 0.5 mm. It is preferable that the thickness of the film cutting portion of the cutting member 1 is small to reduce the resistance to the piercing of the continuous film 11 by the film cutting portion. It is preferable that the width of the cutting member 1 is 1 cm to 3 cm. If the width were more than that, a large space for attachment would be needed and the cutting member and its mount members would be heavier to be inconvenient for maintenance purposes.

The cutting member mounting rest 3 is secured to one end of a cutting member coupler 6 slidable on a guide rail 5 attached to the frame 10 of the body of the film cutter in parallel with the surface of the continuous film 11. The coupler 6 has a guide rail insertion hole which extends through the body of the coupler rightward or leftward with regard to FIG. 1 and through which the guide rail 5 extends. A large number of ball bearings are provided on the inside surface of the coupler 6 in the guide rail insertion hole so that the coupler is slidable together with the ball bearings on the guide rail 5. The other end of the coupler 6 is removably fitted together with an elastic member 12 in the movable member 8 of a pneumatic cylinder 7 having air inlet/outlet ports 7A at both the ends of the cylinder and secured at the ends with attaching members 9 to the frame 10 of the body of the film cutter.

The operation of the film cutter is briefly described from now on. The pneumatic cylinder 7 is driven to move the movable member 8 thereof to set the cutting member 1 in a prescribed position to the fed continuous film 11. The cutting member 1 is then moved forward to the film 11 by the pneumatic cylinder 4 so that the tip of the cutting portion of the cutting member pierces the film. The cutting member 1 is then moved rightward and leftward across the film 11 by the pneumatic cylinder 7 as the film remains pierced by the tip of the cutting portion of the cutting member, so that the film is cut off to a prescribed length.

The movement of the cutting member 1 is described in detail from now on (see FIG. 2). When the cutting member 1 is not used, it is put in a waiting position (1) at the right-hand side edge of the continuous stratified film 11. At that time, the cutting member 1 does not project forward from the cutting member mounting rest 3 but remains retracted thereon for safety. The waiting position (1) may as well be set at the left-hand side edge of the film 11. After sticking the film 11 to the base plate is started, a signal based on a signal from a sensor for detecting the trailing edge of the base plate is sent to a drive control computer for the cutting member 1 so that a cutting member operation start signal is sent out from the computer. The leftward movement of the cutting member 1 is started on the basis of the cutter operation start signal. At that time, the cutting member 1 is protruded to the film 11 by the pneumatic cylinder 4, in a position (2) at the middle of the width of the film, on the basis of the cutting member operation start signal so that the cutting portion of the cutting member pierces the film in a position (3). The cutting member 1 piercing the film 11 is moved leftward further so that the left-hand half of the film is cut off. When the cutting member 1 has reached a position (4) at the left-hand side edge of the film 11, the reaching is detected by a position sensor so that a reaching signal is generated by the sensor. The cutting member 1 is moved rightward on the basis of the reaching signal so that the right-hand half of the film 11 is cut off. After the film 11 is thus completely cut off by the cutting member 1, the member reaches a position (5) at the right-hand side edge of the film and the reaching is detected by a position sensor so that a reaching signal is generated by the sensor. The cutting member 1 is retracted to the waiting position (1) on the cutting member mounting rest 3 on the basis of the reaching signal. The cut-off trailing edge of the film 11 is stuck to the base plate.

As described above, the tip of the cutting portion of the sharp-pointed cutting member 1 is caused to pierce the continuous stratified film 11. The cutting member 1 piercing the film 11 is moved rightward and leftward across the film 11 by the pneumatic cylinder 7 so that the film is cut off to the prescribed length. For that reason, the generation of a chip or the like from the film 11 due to the cutoff thereof is reduced. Since the tip of the cutting portion of the cutting member 1 is caused to pierce the film 11, the stress produced in the film at the time of the start of the cutoff thereof by the cutting member is reduced so that the cutoff is started without distorting or curling the film. For that reason, the film 11 is prevented from failing to be cut off or being improperly cut off, at the time of the start of the cutoff of the film.

Figure 5:
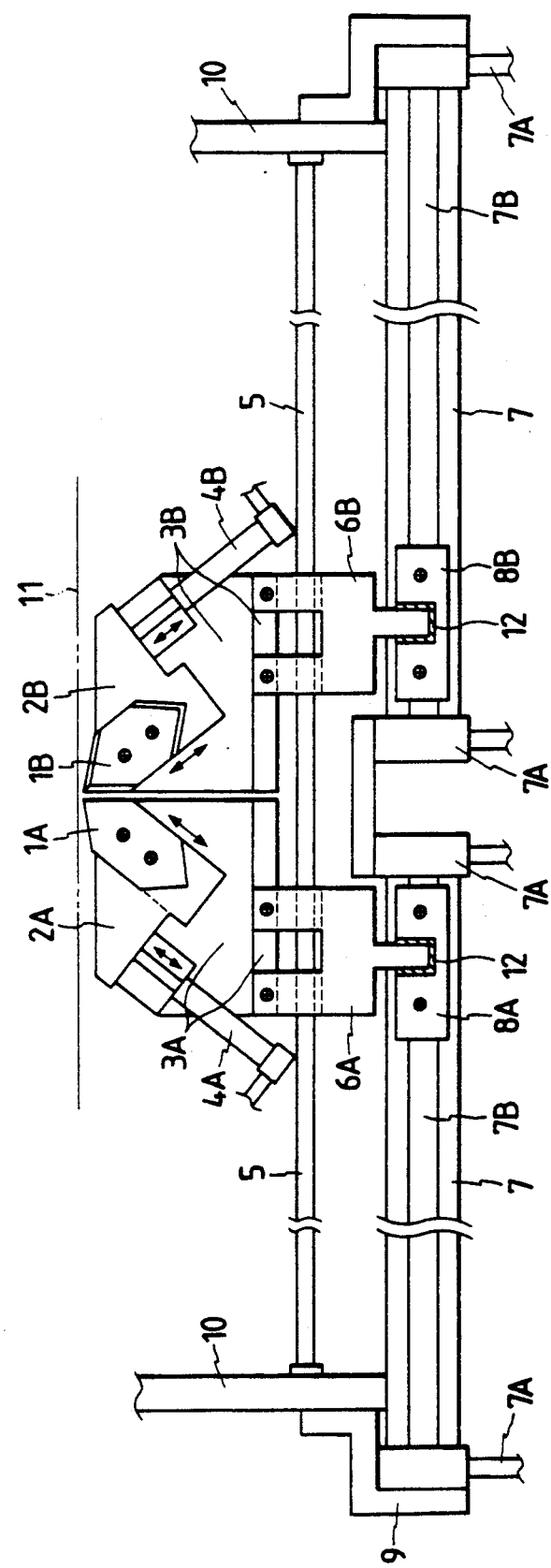
FIG. 5 is a plan view of the film cutter of a sticking apparatus which is another embodiment of the present invention and by which stratified films each consisting of a photosensitive resin layer and a light-transmissible resin film are stuck, under heat and pressure, to the top and bottom of a base plate for a printed circuit board.
Figure 6A:
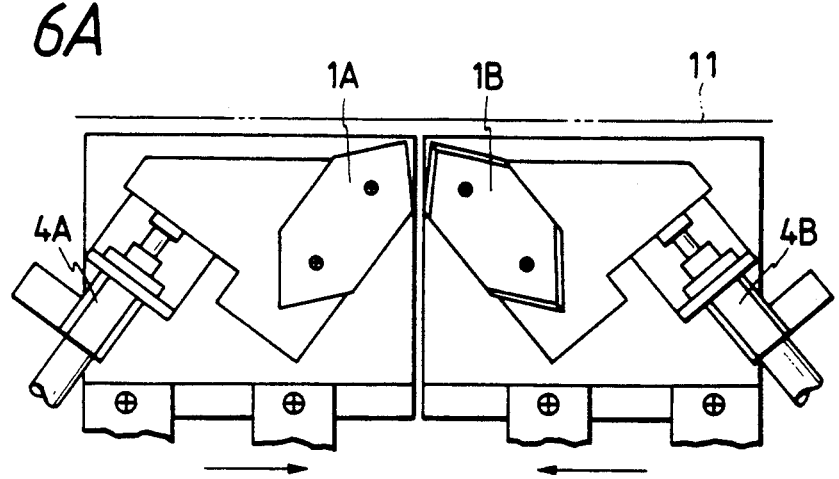
FIGS. 6A, 6B and 6C are views for describing the operation of the film cutter shown in FIG. 5.
Figure 6B:
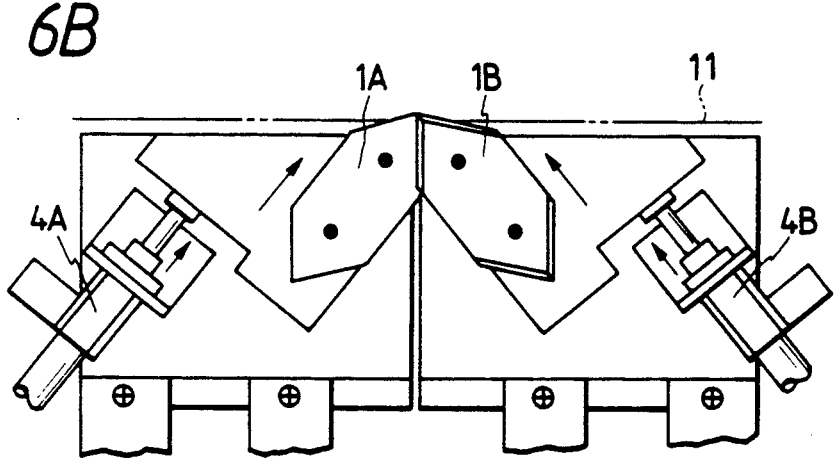
Figure 6C:
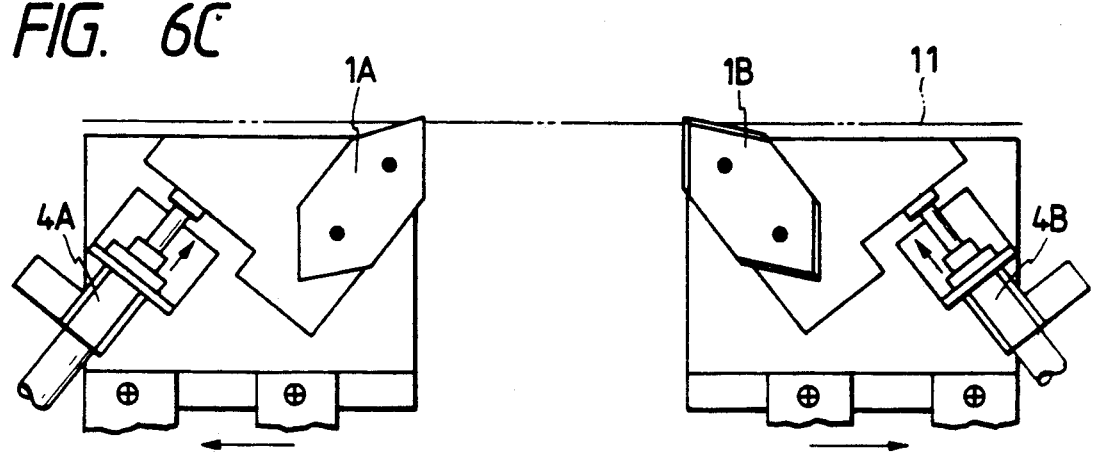

FIG. 5 is a plan view of the film cutter of a sticking apparatus which is the other of the embodiments and by which stratified films each consisting of a photosensitive resin layer and a light-transmissible resin film are stuck, under heat and pressure, to the top and bottom of a base plate for a printed circuit board. FIGS. 6A, 6B and 6C are views for describing the operation of the film cutter. As shown in FIG. 5, the film cutter includes sharp-pointed cutting members 1A and 1B attached to cutting member support frames 2A and 2B secured to a cutting member support rest 2S, so that the cutting edges of the cutting members can overlap with each other. The cutting portion of the cutting member 1A is carved in the manufacturing thereof so that the cutting edge of the cutting portion is located on the top thereof. The cutting portion of the other cutting member 1B is carved in the manufacturing thereof so that the cutting edge of the cutting portion is located on the bottom thereof.

The cutting member support rest 2S is slidably provided on a cutting member slide rail 3L on cutting member mounting rests 3A and 3B so that the cutting members 1A and 1B can be moved backward and forward perpendicularly to the surface of the film 11.

The cutting member support frames 2A and 2B are coupled to the piston rods of pneumatic cylinders 4A and 4B for moving the cutting members 1A and 1B backward and forward perpendicularly to the surface of the film 11.

The cutting member mounting rests 3A and 3B are secured to the ends of cutting member couplers 6A and 6B slidable on a guide rail 5 attached to the frame 10 of the body of the film cutter in parallel with the surface of the film 11. The cutting member couplers 6a and 6B have guide rail insertion holes which extend through the bodies of the couplers rightward or leftward with regard to FIG. 5 and through which the guide rail 5 extends. A large number of ball bearings are provided on the inside surfaces of the couplers 6A and 6B in the guide rail insertion holes so that the couplers 6 are slidable together with the ball bearings on the guide rail. The other ends of the couplers 6a and 6B are removably fitted together with elastic members 12 in the movable members 8A and 8B of pneumatic cylinders 7 which have air inlet/outlet ports 7A at both the ends of the cylinders and are attached at the ends with attaching members 9 to the frame 10 of the body of the film cutter. The movable members 8A and 8B are slid on the movable member slide surfaces 7B of the pneumatic cylinders 7.

Although each of the cutting members 1A and 1B has the cutting edges at both the side edges of the member, each of the members may as well have such a cutting edge at only one side edge of the member.

The operation of the film cutter shown in FIG. 5 is described from now on. The pneumatic cylinder 7 are driven to move the movable members 8A and 8B thereof to set the cutting members 1A and 1B in prescribed positions relative to the continuous stratified film 11 as shown in FIG. 6A. The cutting members 1A and 1B are moved forward to the film 11 by the pneumatic cylinders 4A and 4B so that the tips of the cutting portions of the cutting members pierce the film as the cutting edges of the cutting portions overlap with each other, as shown in FIG. 6B. The cutting members 1A and 1B piercing the film 11 are then moved leftward and rightward, respectively, across the film by the pneumatic cylinders 7 as shown in FIG. 6C, so that the film is cut off to a prescribed length.

As described above, the tips of the cutting portions of the cutting members 1A and 1B are caused to pierce the continuous stratified film 11. The cutting members 1A and 1B piercing the film 11 are then moved leftward and rightward, respectively, across the direction of the feed of the film so that the film is cut off to the prescribed length. For that reason, the generation of a chip or the like from the film 11 due to the cutoff thereof is reduced and the cutoff is rapidly performed. Since the tips of the cutting portions of the cutting members 1A and 1B are caused to pierce the film 11, the stress produced in the film by the cutting members at the time of the start of the cutoff of the film is reduced so that the cutoff can be started without distorting or curling the film. For that reason, the film 11 is prevented from failing to be cut off or being improperly cut off, at the time of the start of the cutoff of the film.

The present invention is not confined to the embodiments described above, but may be embodied or practiced in other various ways without departing the spirit or essential character thereof.

According to the present invention, the tip of the cutting portion of a sharp-pointed cutting member is caused to pierce a continuous film, and the cutting member is then moved rightward and leftward across the direction of the feed of the film so that the film is cut off to a prescribed length. For that reason, the generation of a chip or the like film due to the cutoff thereof is reduced.

According to the present invention, the tips of the cutting portions of a pair of sharp-pointed cutting members are caused to pierce a continuous film, and the cutting members are then moved rightward and leftward, respectively, across the direction of the feed of the film so that the film is cut off to a prescribed length. For that reason, the generation of a chip or the like from the film due to the cutoff thereof is reduced, and the cutoff is rapidly performed.

Since the tip of the cutting portion of each of the above-mentioned sharp-pointed cutting members is caused to pierce the continuous film, the stress produced in the film by the cutting member at the time of the start of the cutoff of the film is reduced so that the cutoff is started without distorting or curling the film. Also, since the tip of each sharp-pointed cutting member pierces the continuous film and is moved rightward and leftward in a direction intersecting with the continuous film supply direction, thereby cutting the film in a prescribed length, it is possible to smoothly cut the film in the initial cutting state even if the film side edge is curled. For that reason, the film is prevented from failing to be cut off or being improperly cut off, at the time of the start of the cutoff of the film.

What is claimed is:

1. A method of cutting and sticking a continuous film to each of a plurality of base plates, said method comprising the steps of:
   (a) a piercing said continuous film at a predetermined point, which is located intermediate to transverse side edges of said continuous film, with the tips of the cutting portions of a pair of sharp-pointed cutting members;
   (b) moving, in a direction across a feed direction of said continuous film, one of said cutting members from said predetermined point toward one transverse side edge of said continuous film, and moving, in a direction across a feed direction of said continuous film, the other of said cutting members from said predetermined point toward the other transverse side edge of said continuous film, so that said continuous film is cut of to a prescribed length; and (c) sticking said cut-off film to a corresponding one of said base plates.

2. A film sticking apparatus for cutting and sticking a film to a base plate, said apparatus including a pair of film cutters for cutting off a continuous film to a prescribed length, wherein each of said film cutters comprises:

a cutting member having a cutting edge thereon;

means for moving said film cutter in a direction across a feed direction of said continuous film; and means for moving said film cutter vertically up and down with respect to said continuous film, such that said cutting edges of said cutting members of said pair of film cutters pierce said continuous film at a predetermined point, which is located intermediate to transverse side edges of said continuous film, and one of said film cutters moves from said predetermined point toward one transverse side edge of said continuous film, while the other of said film cutters moves from said predetermined point toward the other transverse side edge of said continuous film so as to cut off said continuous film to the prescribed length.

* * * * *